United States Patent [19]
Nishi

[11] Patent Number: 5,848,747
[45] Date of Patent: *Dec. 15, 1998

[54] WELDING LINE SYSTEM AND METHOD OF WELDING WORKPIECES

[75] Inventor: Yasuhiro Nishi, Kumamoto, Japan

[73] Assignee: Honda Giken Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 602,329

[22] Filed: Feb. 16, 1996

[30] Foreign Application Priority Data

Apr. 25, 1995 [JP] Japan .................................. 7-099278

[51] Int. Cl.$^6$ .................................................. B23K 31/00
[52] U.S. Cl. ............................ 228/213; 228/6.1; 228/47.8
[58] Field of Search ................................ 228/47.8, 4.1 A, 228/6.1 A, 47.1, 213

[56] References Cited

U.S. PATENT DOCUMENTS

| | | | |
|---|---|---|---|
| 4,441,645 | 4/1984 | Takagishi et al. | 228/49.8 |
| 4,611,749 | 9/1986 | Kawano | 228/49.8 |
| 5,127,569 | 7/1992 | Sekine et al. | 228/49.8 |

FOREIGN PATENT DOCUMENTS

| | | |
|---|---|---|
| 4-17979 | 1/1992 | Japan . |
| 6-238457 | 8/1994 | Japan . |

*Primary Examiner*—Kenneth J. Ramsey
*Attorney, Agent, or Firm*—Merchant, Gould, Smith, Edell, Welter & Schmidt

[57] ABSTRACT

A welding line system has a transfer robot dispose closely to and between a workpiece loading line for loading preliminarily welded four-wheeled buggy frames and a workpiece unloading line for unloading fully welded four-wheeled buggy frames. The welding line system also has a main welding station including a plurality of welding sections disposed around the transfer robot and having respective workpiece holders. The workpiece holders are arranged such that the preliminarily welded frames supported thereby have respective longitudinal axes whose hypothetical extensions cross each other in the vicinity of the transfer robot. The transfer robot transfers preliminarily welded frames successively delivered along the workpiece loading line successively to the workpiece holders, and receives fully welded frames successively from the workpiece holders and discharges them to the workpiece unloading line.

10 Claims, 5 Drawing Sheets

WELDING LINE SYSTEM AND METHOD OF WELDING WORKPIECES

BACKGROUND OF THE INVENTION

1. Field of the Invention

The present invention relates to a welding line system for, and a method of, welding workpieces such as motorcycle frames, four-wheeled buggy frames, or the like.

2. Description of the Prior Art

It has been customary to assemble a plurality of parts into a workpiece such as a motorcycle frame, a four-wheeled buggy frame, or the like by welding the parts into a preliminarily joined assembly, conveying the joined assembly to a main welding station, and then completely welding the preliminarily joined assembly into a fully welded workpiece in the main welding station. One conventional welding line system for carrying out such a welding process is disclosed in Japanese laid-open patent publication No. 4-17979, for example.

FIG. 8 of the accompanying drawings shows the disclosed welding line system. As shown in FIG. 8, the welding line system comprises a plurality of welding sections 53 each having a transfer robot 51 and a pair of welding robots 52. The welding sections 53 are arranged in a succession along a production line, which is shown vertical in FIG. 8, with a turntable 54 interposed therebetween. Actually, there are a plurality of such production lines arranged in juxtaposed relationship. A workpiece loading line 55 and a workpiece unloading line 56 are positioned one on each side of the welding sections 53 and extend parallel to each other perpendicularly to the production lines.

A workpiece W that is being fed on the workpiece loading line 55 is gripped by the transfer robot 51, which is positioned upstream of the turntable 54 in the production line, and delivered to the upstream welding section 53. In the upstream welding section 53, the workpiece W is welded by the welding robots 52. The welded workpiece W is then transferred to the turntable 54 by the upstream transfer robot 51. The workpiece W on the turntable 54 is thereafter gripped by the transfer robot 51, which is positioned downstream of the turntable 54 in the production line, and delivered to the downstream welding section 53. The workpiece W is welded by the welding robots 52 of the downstream welding section 53. The fully welded workpiece W is discharged by the transfer robot 51 onto the unloading line 56.

Each of the transfer robots 51 is occupied by the corresponding welding section 53. Therefore, each of the transfer robot 51 cannot handle another workpiece W after it brings one workpiece W into the corresponding welding section 53 until it transfers the welded workpiece W from the welding section 53 to the turntable 54 or the workpiece unloading line 56. Consequently, the transfer robots 51 have a relatively long idle time, and are relatively poor in efficiency.

SUMMARY OF THE INVENTION

It is therefore an object of the present invention to provide a welding line system which includes a transfer robot that operates highly efficiently in cooperation with a plurality of welding sections.

Another object of the present invention is to provide a method of welding workpieces highly efficiently.

According to the present invention, there is provided a welding line system comprising a plurality of welding sections for welding workpieces, respectively, and a single transfer robot for transferring workpieces to and from the welding sections, the welding sections being positioned within an operating range of the single transfer robot, the welding sections having respective holding means for holding the workpieces. The welding line system may further comprise a workpiece loading line for loading workpieces and a workpiece unloading line for unloading workpieces, the workpiece loading line having a loading region and the workpiece unloading line having an unloading region, the loading region and the unloading region being positioned within the operating range of the single transfer robot.

According to the present invention, there is also provided a welding line system comprising a first preliminary welding station for preliminarily welding parts alternately into a plurality of workpiece blanks, a second preliminary welding station for preliminarily welding the workpiece blanks from the first preliminary welding station successively into preliminarily welded workpieces, a workpiece loading line for loading the preliminarily welded workpieces successively from the second preliminary welding station, a main welding station for fully welding the preliminarily welded workpieces successively from the workpiece loading line, and a workpiece unloading line for unloading fully welded workpieces successively from the main welding station, the main welding station having a single transfer robot for receiving the preliminarily welded workpieces successively from the workpiece loading line and discharging the fully welded workpieces successively to the workpiece unloading line, and a plurality of welding sections positioned within an operating range of the transfer robot, the welding sections having respective holding means for holding the preliminarily welded workpieces. The workpiece loading line may have a loading region and the workpiece unloading line may have an unloading region, the loading region and the unloading region being positioned within the operating range of the single transfer robot.

In each of the above welding line systems, the holding means may be arranged such that the preliminarily welded workpiece held thereby have respective longitudinal axes extending radially around the single transfer robot. The holding means may be disposed along respective vertical planes extending radially around the single transfer robot, each of the welding sections having a pair of welding robots disposed one on each side of the holding means. The welding robots of each of the welding sections may be disposed along respective vertical planes extending perpendicularly or obliquely to the respective vertical plane along which the holding means are disposed.

According to the present invention, there is further provided a method of welding a succession of workpieces, comprising the steps of transferring a plurality of workpieces from a single transfer robot successively to respective welding sections, welding workpieces respectively in the welding sections, and transferring the welded workpieces successively from the welding stations to the single transfer robot. The method may further comprise the step of holding the workpieces while the workpieces are being welded respectively in the welding sections. The method may further comprise the steps of loading the workpieces to be welded successively to the single transfer robot, and unloading the welded workpieces successively from the single transfer robot.

According to the present invention, there is also provided a method of welding a succession of workpieces, comprising the steps of preliminarily welding parts into a plurality of workpiece blanks, preliminarily welding the workpiece blanks successively into preliminarily welded workpieces, loading the preliminarily welded workpieces successively from a workpiece loading line to a single transfer robot, transferring the preliminarily welded workpieces from the single transfer robot successively to respective welding sections, completely welding the preliminarily welded workpieces in the respective welding sections, transferring the completely welded workpieces from the welding sections to the single transfer-robot, and unloading the completely welded workpieces successively from the single transfer robot to a workpiece unloading line. The method may further comprise the step of holding the workpieces while the workpieces are being completely welded respectively in the welding sections.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
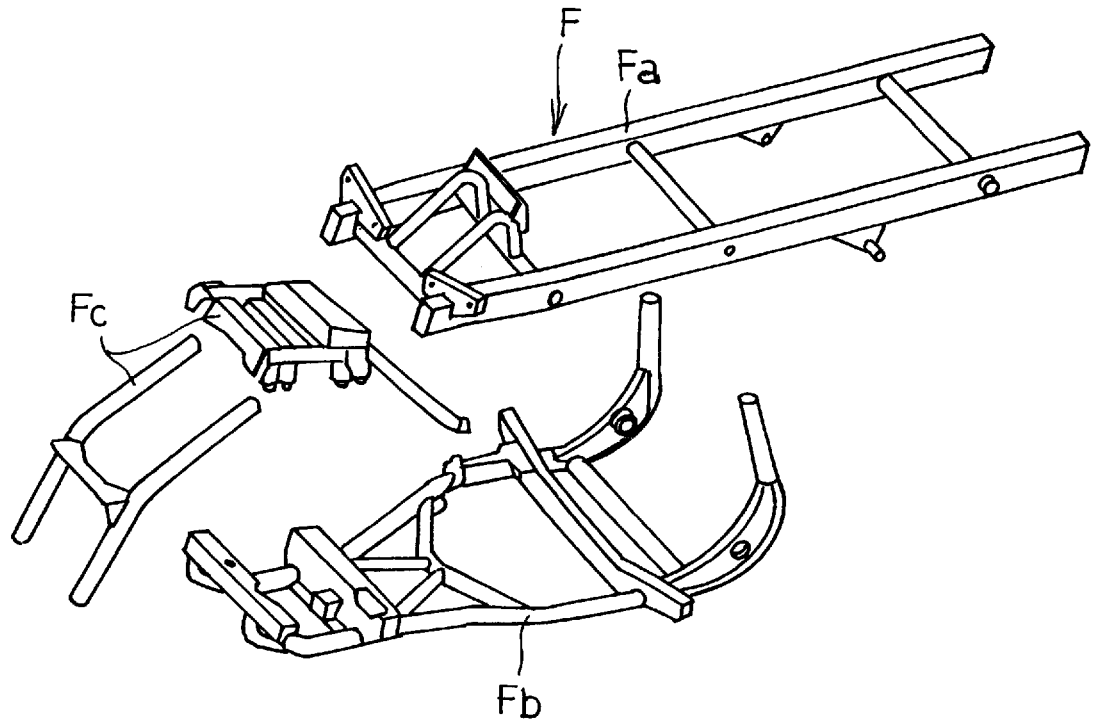
FIG. 1 is a perspective view of an upper assembly, a lower assembly, and accessories which are to be welded into a four-wheeled buggy frame.
Figure 2:
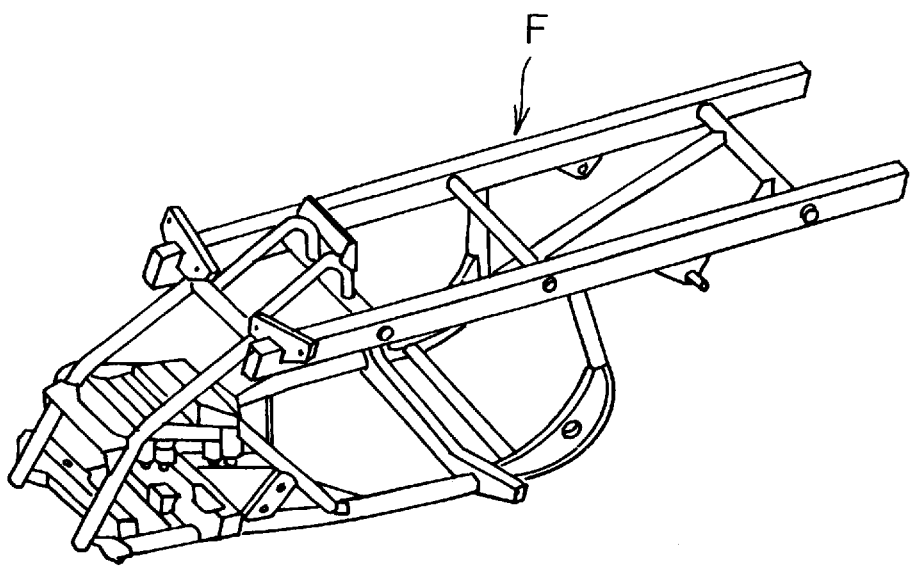
FIG. 2 is a perspective view of a four-wheeled buggy frame assembled from the upper assembly, the lower assembly, and the accessories shown in FIG. 1.

The principles of the present invention are particularly useful when embodied in a welding line system for assembling a workpiece such as a motorcycle frame, a four-wheeled buggy frame, or the like. According to the present invention, a welding line system for welding an upper assembly Fa, a lower assembly Fb, and accessories Fc as shown in FIG. 1 to each other thereby to produce a four-wheeled buggy frame F as shown in FIG. 2 will be described below.

Figure 3:
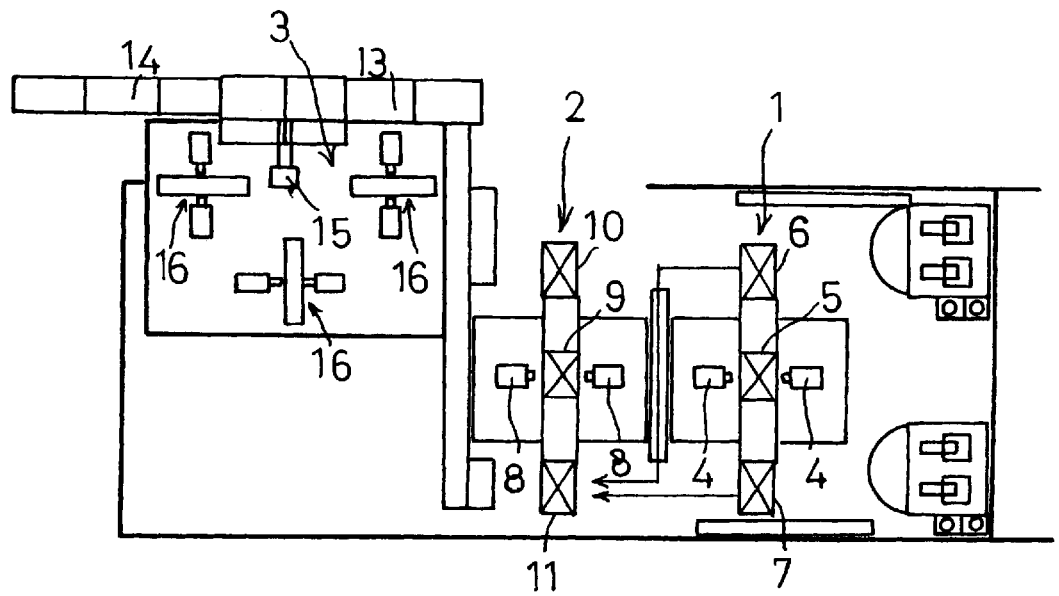
FIG. 3 is a schematic plan view of a welding line system according to the present invention.

As shown in FIG. 3, the welding line system according to the present invention comprises a first preliminary assembling station 1 for preliminarily welding parts into an upper assembly Fa and a lower assembly Fb, a second preliminary assembling station 2 for combining the upper assembly Fa, the lower assembly Fb, and accessories Fc with each other and preliminarily welding them to each other, and a main assembling station 3 for finally completely welding the upper assembly Fa, the lower assembly Fb, and the accessories Fc to each other.

The first preliminary assembling station 1 comprises a pair of welding robots 4, a central spot 5 positioned between the welding robots 4, and a pair of parts assembling spots 6, 7 positioned one on each side of the central spot 5. In the parts assembling spot 6, the worker assembles parts for an upper assembly Fa on a jig. In the parts assembling spot 7, the worker assembles parts for a lower assembly Fb on a jig. While the worker is assembling parts for an upper assembly Fa on the jig in the parts assembling spot 6, for example, the welding robots 4 preliminarily weld parts for a lower assembly Fb on the jig in the central spot 5, thereby producing the lower assembly Fb which has been preliminarily welded. Thereafter, the jig in the central spot 5, on which the preliminarily welded lower assembly Fb is supported, is moved to the parts assembling spot 7, and the jig in the parts assembling spot 6, on which the parts for an upper assembly Fa have been assembled, is moved to the central spot 5.

While the welding robots 4 are preliminarily welding the parts for an upper assembly Fa on the jig in the central spot 5, the lower assembly Fb which has been preliminarily welded is discharged from the parts assembling spot 7, and then the worker assembles new parts for a lower assembly Fb again on the jig in the parts assembling spot 7. In this manner, the jigs for assembling parts for an upper assembly Fa and parts for a lower assembly Fb thereon are reciprocally moved between the parts assembling spots 6, 7 and the central spot 5, and parts for upper and lower assemblies Fa, Fb are preliminarily welded alternately into upper and lower assemblies Fa, Fb by the welding robots 4 in the central spot 5.

The second preliminary assembling station 2 comprises a pair of welding robots 8, a central spot 9 positioned between the welding robots 8, and a pair of assembling spots 10, 11 positioned one on each side of the central spot 9. In each of the assembling spots 10, 11, the worker assembles an upper assembly Fa, a lower assembly Fb, and accessories Fc on a jig. While the worker is assembling an upper assembly Fa, a lower assembly Fb, and accessories Fc on a jig in the assembling spot 11, for example, the welding robots 8 preliminarily weld an upper assembly Fa, a lower assembly Fb, and accessories Fc on a jig in the central spot 9, thereby producing a frame F which has been preliminarily welded. Thereafter, the jig in the central spot 9, on which the preliminarily welded frame F is supported, is moved to the assembling spot 10, and the jig in the assembling spot 11, on which the upper assembly Fa, the lower assembly Fb, and the accessories Fc have been assembled, is moved to the central spot 9.

While the welding robots 8 are preliminarily welding the upper assembly Fa, the lower assembly Fb, and the accessories Fc on the jig in the central spot 9, the preliminarily welded frame F is discharged from the assembling spot 10, and then the worker assembles an upper assembly Fa, a lower assembly Fb, and accessories Fc on the jig in the assembling spot 10. In this manner, the jigs for assembling an upper assembly Fa, a lower assembly Fb, and accessories Fc thereon are reciprocally moved between the assembling spots 10, 11 and the central spot 9, and upper and lower assemblies Fa, Fb and accessories Fc are preliminarily welded into frames F by the welding robots 8 in the central spot 9.

Figure 4:
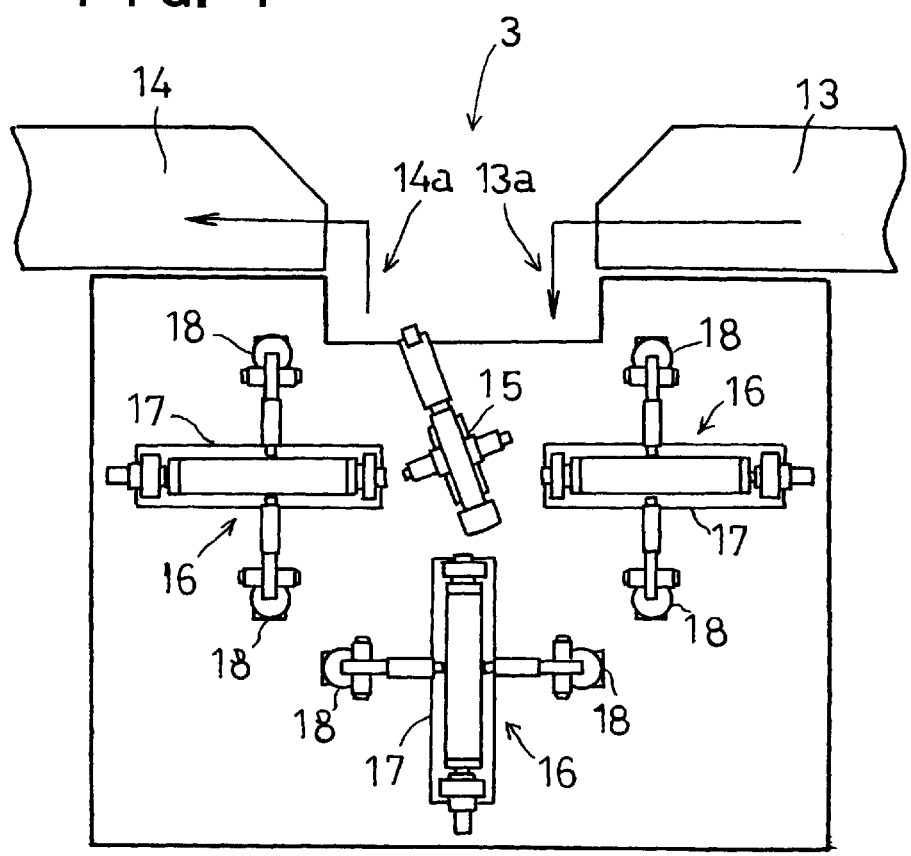
FIG. 4 is an enlarged plan view of a main assembling station of the welding line system.

As shown in FIG. 4, the main assembling station 3 comprises a transfer robot 15 and a plurality of welding sections 16 each having a workpiece holder 17 and a pair of welding robots 18 disposed one on each side of the workpiece holder 17. The welding sections 16 effect identical welding operations independently of each other such that even when one of the welding sections 16 is accidentally or intentionally shut off, the other welding sections 16 can continuously carry on the welding operations. The main assembling station 3 has a suitable workpiece identifying means (not shown) for identifying the types of workpieces that are introduced into the main assembling station 3. Each of the welding sections 16 can perform its welding process, which has been taught in advance, on a workpiece based on identifying information from the workpiece identifying means even if the workpiece is of a type different from workpieces that are processed by the other welding sections 16.

The workpiece holders 17 are disposed along vertical planes which extend radially around the transfer robot 15. The welding robots 18 are disposed along vertical planes extending perpendicularly to the vertical plane along which the workpiece holder 17 is disposed in each of the welding sections 16. Specifically, the welding robots 18 have respective bases 18a whose longitudinal axes are directed to the longitudinal axis of the workpiece holder 17.

The transfer robot 15 is positioned closely to and between a workpiece loading line 13 and a workpiece unloading line 14. The welding sections 16, which are three in number in the embodiment shown in FIGS. 3 and 4, are disposed around the transfer robot 15. The workpiece loading line 13 has a loading region 13a at an end thereof near the main welding station 3 and the workpiece unloading line 14 has an unloading region 14a at an end thereof near the main welding station 3. The loading region 13a, the unloading region 14a, and the welding sections 16 are positioned within an operating range of the transfer robot 15.

The workpiece holders 17 in the respective welding sections 16 hold respective workpieces, i.e., preliminarily welded frames F, such that the frames F supported by the workpiece holders 17 have respective hypothetical extensions of their longitudinal axes crossing each other in the vicinity of the transfer robot 15. Specifically, the longitudinal axes of the workpiece holders 17 are angularly spaced, or extend radially, around the transfer robot 15. This angular orientation of the workpiece holders 17 allows many welding sections 16 to be placed around the transfer robot 15, so that the installation space for the main welding station 3 can be minimized. The installation space for he main welding station 3 is also reduced because the welding robots 18 are positioned one on each side of the radially extending workpiece holder 17 in each of the welding sections 16.

Figure 5:
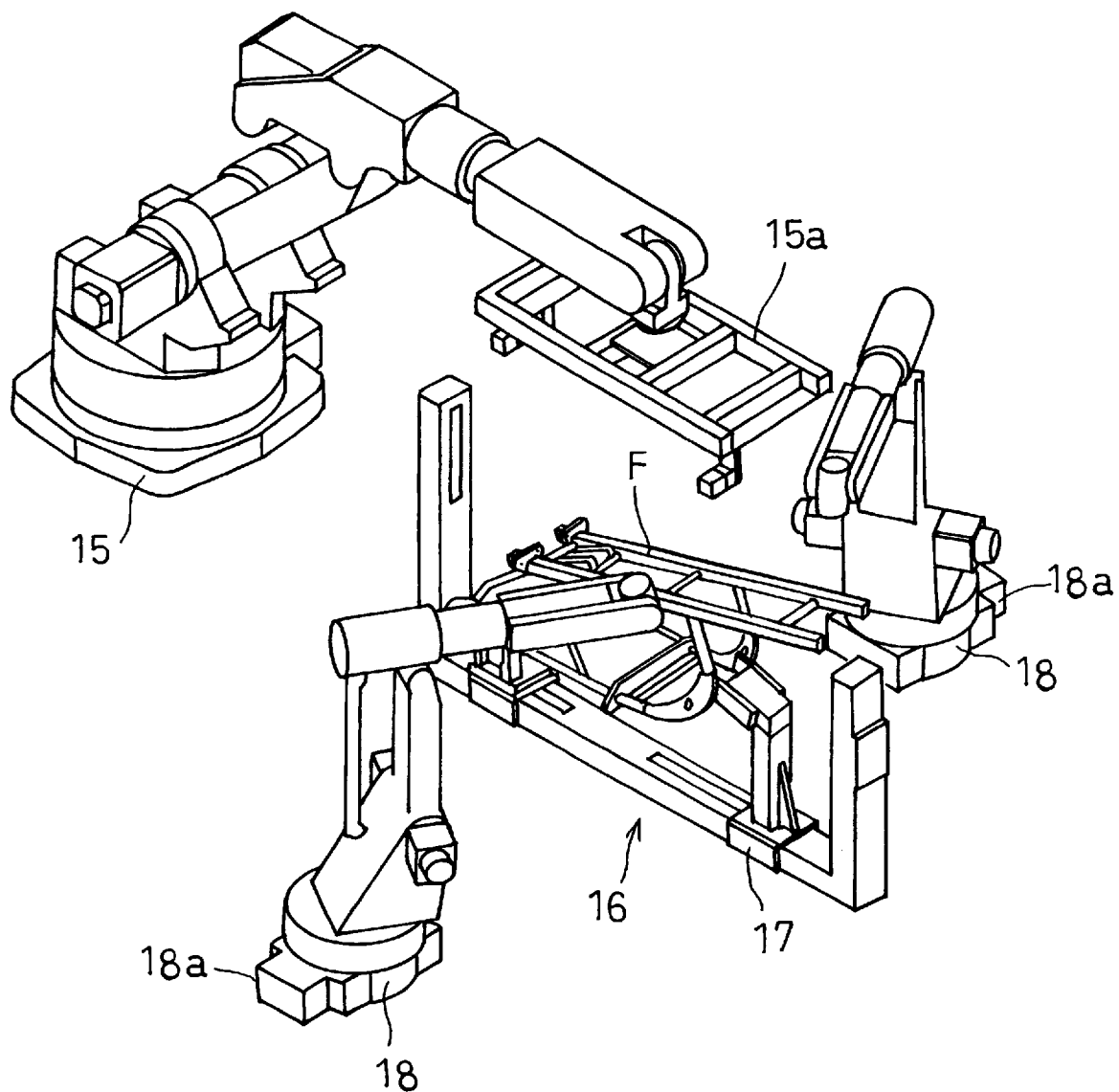
FIG. 5 is a perspective view of a welding assembly in the main assembling station.

As shown in FIG. 5, the workpiece holder 17 in each of the welding sections 16 receives a preliminarily welded frame F from a gripper 15a of the transfer robot 15, grips longitudinally opposite ends of the preliminarily welded frame F, and turns the preliminarily welded frame F about its longitudinal axis to change its attitude successively through desired angular positions with respect to the welding robots 18. The welding robots 18 completely weld the preliminarily welded frame F while it is being turned about its longitudinal axis successively through the angular positions.

Operation of the welding line system will be described below. In the first preliminary welding station 1, given parts are welded into an upper assembly Fa and a lower assembly Fb. In the second preliminary assembling station 2 the upper assembly Fa, the lower assembly Fb, and accessories Fc are combined with each other and preliminarily welded to each other, thus making up a preliminarily welded frame F. Preliminarily welded frames F discharged from the second preliminary assembling station 2 are successively conveyed along the loading line 13 to the main welding station 3, and then gripped, one by one, by the transfer robot 15 at the loading region 13a.

The transfer robot 15 transfers preliminarily welded frames F from the loading region 13a successively to the workpiece holders 17 in the welding sections 16, receives completely welded frames F successively from the workpiece holders 17, and discharges them successively to the unloading region 14a of the unloading line 14. At this time, the transfer robot 15 angularly moves intermittently between angularly spaced positions radially aligned with the loading region 13a, the welding sections 16, and the unloading region 14a. Because the single transfer robot 15 transfers preliminarily welded frames F from the loading region 13a successively to the workpiece holders 17, receives completely welded frames F successively from the workpiece holders 17, and transfers the completely welded frames F successively to the unloading region 14a, the transfer robot 15 operates highly efficiently, and the entire welding line system has a high rate of production.

Figure 6:
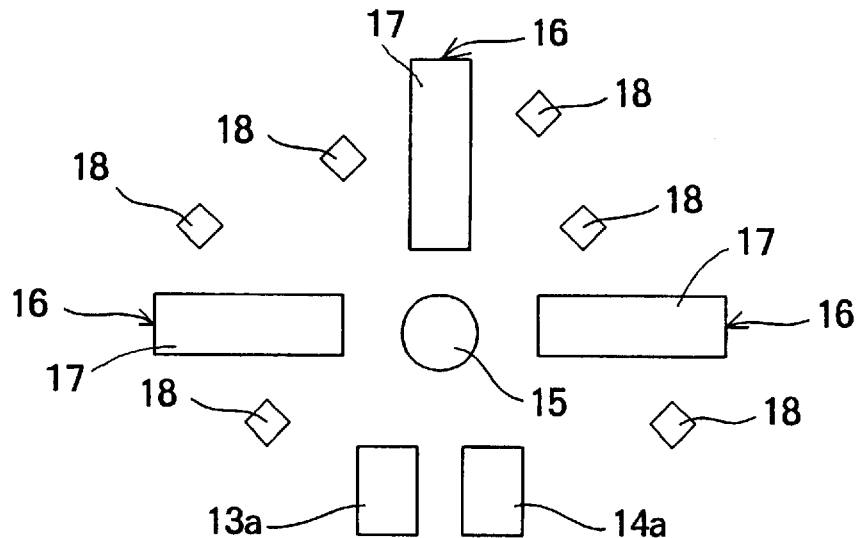
FIG. 6 is a schematic plan view showing a layout of the main welding station.

FIG. 6 schematically shows a layout of the main welding station. In the layout shown in FIG. 6, the welding robots 18 are disposed along vertical planes which extend obliquely to the associated workpiece holder 17.

Figure 7:
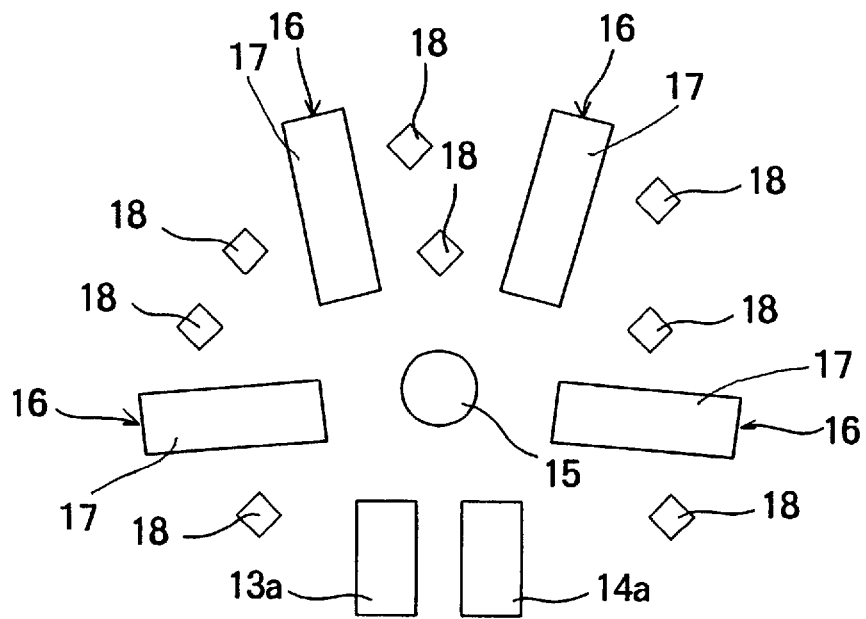
FIG. 7 is a schematic plan view showing another layout of the main welding station.
Figure 8:
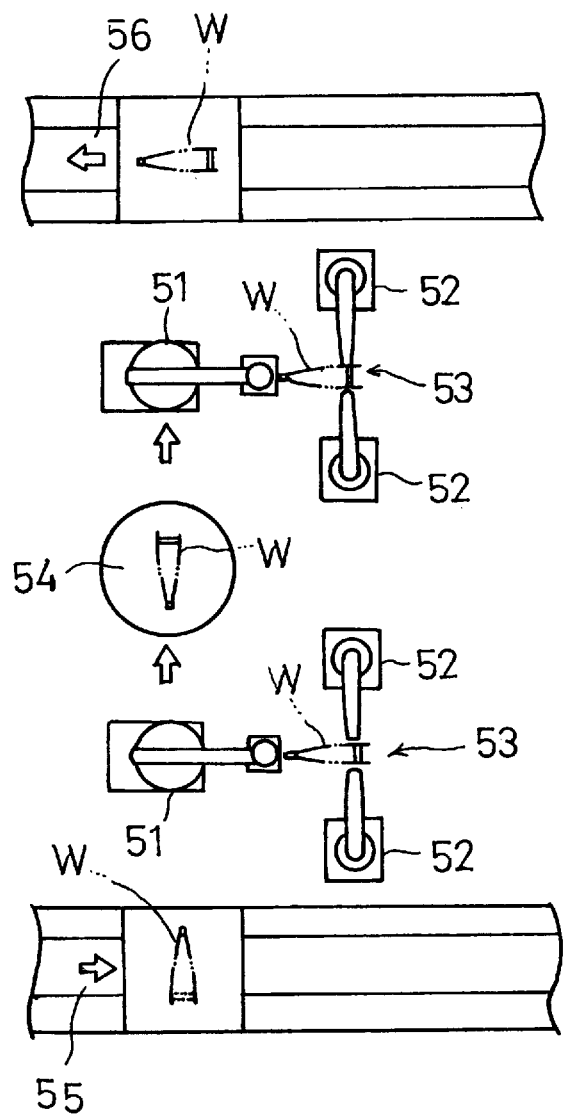
FIG. 8 is a schematic plan view of a conventional welding line system.

FIG. 7 schematically shows another layout of the main welding station. In the layout shown in FIG. 7, the main welding station has four welding sections 16 positioned around the transfer robot 15. Of course, the main welding station may have more than four welding sections 16 positioned around the transfer robot 15.

In each of the arrangements shown in FIGS. 6 and 7, the workpiece holders 17 in the respective welding sections 16 hold respective preliminarily welded frames F such that the frames F supported by the workpiece holders 17 have respective hypothetical extensions of their longitudinal axes crossing each other in the vicinity of the transfer robot 15, i.e., the longitudinal axes of the workpiece holders 17 are angularly spaced, or extend radially, around the transfer robot 15. Consequently, the layouts shown in FIGS. 6 and 7 allow many welding sections 16 to be placed around the transfer robot 15, resulting in a compact or small installation space for the main welding station 3.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A welding line system comprising:

a plurality of welding sections for welding workpieces, respectively; and a single transfer robot for transferring workpieces to and from said welding sections, said welding sections being positioned within an operating range of said single transfer robot, said welding sections having respective holding means for holding the workpieces transferred to and from said single transfer robot, said holding means being arranged so that the workpieces held thereby have respective longitudinal axes extending radially around said single transfer robot;

a workpiece loading line for loading workpieces, said workpiece loading line having a loading region; and a workpiece unloading line for unloading workpieces, said workpiece unloading line having an unloading region and said loading region and said unloading region being positioned within said operating range of said single transfer robot.

2. A welding line system according to claim 1, wherein said holding means are disposed along respective vertical planes extending radially around said single transfer robot, each of said welding sections having a pair of welding robots disposed one on each side of the holding means.

3. A welding line system according to claim 2, wherein said welding robots of each of said welding sections are disposed along respective vertical planes extending perpendicularly to said respective vertical plane along which said holding means are disposed.

4. A welding line system according to claim 2, wherein said welding robots of each of said welding sections are disposed along respective vertical planes extending obliquely to said respective vertical plane along which said holding means are disposed.

5. A method of welding a succession of workpieces, comprising the steps of:
  unloading workpieces from a loading region of a workpiece loading line using a single transfer robot, said loading region being positioned within an operating range of the single transfer robot;
  transferring the workpieces from said single transfer robot successively to respective welding sections, said welding sections having respective holding means for holding the workpieces transferred to and from said single transfer robot, said holding means being arranged so that the workpieces held thereby have respective longitudinal axes extending radially around said single transfer robot;
  welding the workpieces respectively in said welding sections;
  transferring the welded workpieces successively from said welding stations to the single transfer robot; and
  loading the workpieces onto an unloading region of a workpiece unloading line using the single transfer robot, said unloading region being positioned within the operating range of the single transfer robot.

6. A method of welding a succession of workpieces, comprising the steps of:
  preliminarily welding parts into a plurality of workpiece blanks;
  preliminarily welding the workpiece blanks successively into preliminarily welded workpieces;
  loading the preliminarily welded workpieces successively from a workpiece loading line to a single transfer robot;
  transferring the preliminarily welded workpieces from the single transfer robot successively to respective welding sections, said welding sections having respective holding means for holding the workpieces transferred to and from said single transfer robot, said holding means being arranged so that the workpieces held thereby have respective longitudinal axes extending radially around said single transfer robot;
  completely welding the preliminarily welded workpieces in the respective welding sections;
  transferring the completely welded workpieces from the welding sections to the single transfer robot; and
  unloading the completely welded workpieces successively from the single transfer robot to a workpiece unloading line.

7. A welding line system comprising:
  a first preliminary welding station for preliminarily welding parts alternately into a plurality of workpiece blanks;
  a second preliminary welding station for preliminarily welding the workpiece blanks from said first preliminary welding station successively into preliminarily welded workpieces;
  a workpiece loading line for loading the preliminarily welded workpieces successively from said second preliminary welding station;
  a main welding station for completely welding the preliminarily welded workpieces successively from said workpiece loading line; and
  a workpiece unloading line for unloading completely welded workpieces successively from said main welding station;
  said main welding station having a single transfer robot for receiving the preliminarily welded workpieces successively from said workpiece loading line and discharging the fully welded workpieces successively to said workpiece unloading line, and a plurality of welding sections positioned within an operating range of said transfer robot, said welding sections having respective holding means for holding the preliminarily welded workpieces, said holding means being arranged such that the preliminarily welded workpieces held thereby have respective longitudinal axes extending radially around said single transfer robot.

8. A welding line system comprising:
  a first preliminary welding station for preliminarily welding parts alternately into a plurality of workpiece blanks;
  a second preliminary welding station for preliminarily welding the workpiece blanks from said first preliminary welding station successively into preliminarily welded workpieces;
  a workpiece loading line for loading the preliminarily welded workpieces successively from said second preliminary welding station;
  a main welding station for completely welding the preliminarily welded workpieces successively from said workpiece loading line; and
  a workpiece unloading line for unloading completely welded workpieces successively from said main welding station;
  said main welding station having a single transfer robot for receiving the preliminarily welded workpieces successively from said workpiece loading line and discharging the fully welded workpieces successively to said workpiece unloading line, and a plurality of welding sections positioned within an operating range of said transfer robot, said welding sections having respective holding means for holding the preliminarily welded workpieces, said holding means being disposed along respective vertical planes extending radially around said single transfer robot, each of said welding sections having a pair of welding robots disposed one on each side of the holding means.

9. A welding line system according to claim 8, wherein said welding robots of each of said welding sections are disposed along respective vertical planes extending perpendicularly to said respective vertical plane along which said holding means are disposed.

10. A welding line system according to claim 8, wherein said welding robots of each of said welding sections are disposed along respective vertical planes extending obliquely to said respective vertical plane along which said holding means are disposed.

* * * * *